March 8, 1932. S. W. E. ANDERSSON 1,848,815
POSITION INDICATOR
Filed Aug. 22, 1931
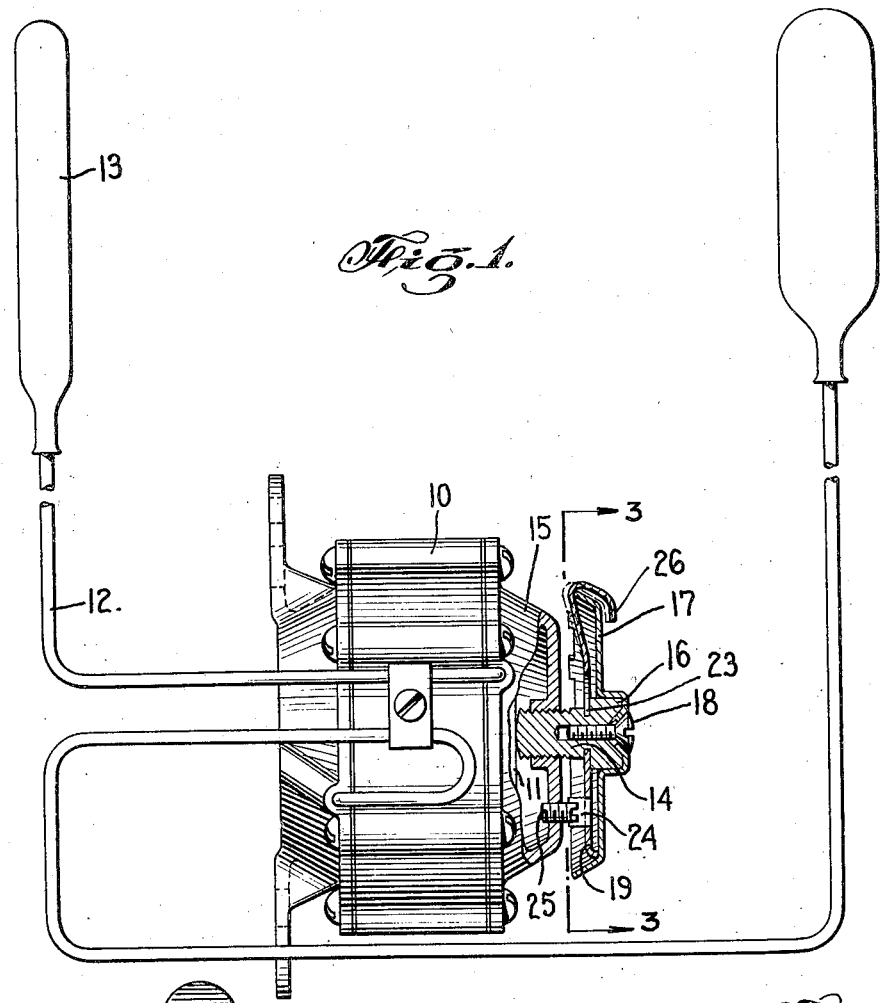
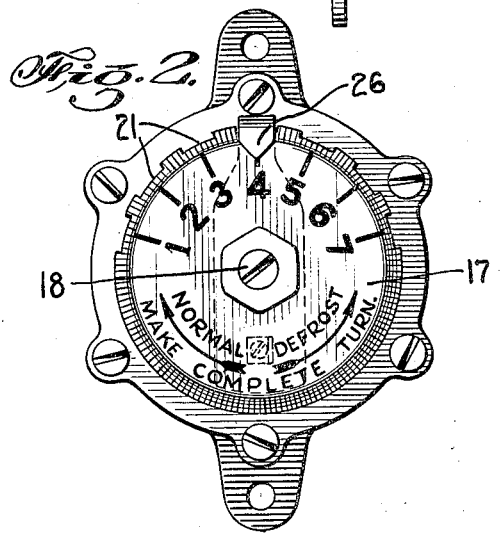
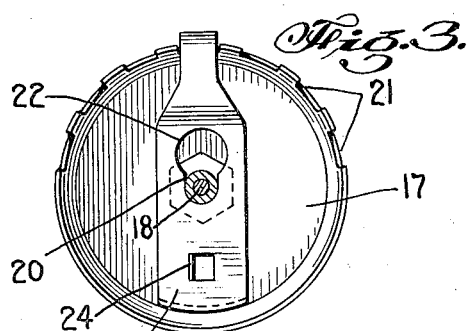
INVENTOR.
Sven W. E. Andersson
BY A. Yates Dowell
ATTORNEY Patented Mar. 8, 1932

1,848,815

UNITED STATES PATENT OFFICE

SVEN W. E. ANDERSSON, OF NEW YORK, N. Y., ASSIGNOR TO SERVEL SALES, INC., OF NEW YORK, N. Y., A CORPORATION OF DELAWARE

POSITION INDICATOR

Application filed August 22, 1931. Serial No. 558,736.

This invention relates to indicators and more particularly to rotary position indicators of the dial and pointer type.

A salient field of application of this invention is the control of mechanical refrigerators. In absorption refrigerating systems of the continuous type the cooling element is maintained at a substantially constant temperature by thermostatic control of the heating of the generator and the control thermostat is made adjustable so that the system may be operated at any desired evaporator temperature. When the apparatus is used for both cooling a food storage compartment and freezing water into ice cubes it is operated at an evaporator temperature below freezing and when there is air circulation over the evaporator or cooling element, which must be the case when a food storage compartment is cooled, moisture condenses out of the air onto the cooling element and a layer of frost gradually builds up which must be removed at intervals both as a sanitary precaution and for efficient refrigeration.

Defrosting may be accomplished by temporarily changing the adjustment of the control thermostat so that the apparatus will operate at a cooling element temperature above freezing long enough for the frost to melt, after which the thermostat is returned to its normal operating adjustment. The control thermostat is usually of the expansible fluid type comprising a sensitive bulb attached to the cooling element and connected through a capillary tube to a closed sylphon bellows which is fixed at one end and has its other end connected to operate a control valve, switch, or the like.

Adjustment of thermostats of this type is accomplished by a spring or equivalent means, the tension of which is varied by an adjusting screw, which latter is provided with a knob and pointer rotating over a fixed scale or a knob and dial with a fixed pointer for indicating the adjustment. After the adjusting screw has been set for normal operation of the apparatus this setting must be disturbed at intervals for defrosting of the cooling element, as set forth above, and in order to return the adjusting screw to its normal setting it is necessary to remember or record the position of the dial or pointer before the setting is disturbed.

It is an object of this invention to obviate this inconvenience and it is accomplished by providing in combination with the knob and dial on the adjusting screw a movable pointer limited in movement by a fixed stop and which pointer normally engages the dial but may be disengaged when determining the normal setting of the adjusting screw.

This invention will be more full understood by reference to the following description when taken in connection with the accompanying drawings, in which, Fig. 1 illustrates in side elevation with parts in section one application of the invention to a control thermostat of an absorption refrigerating apparatus of the pressure equalized type known in commerce as the Electrolux;

Fig. 2 is a front view of the dial in Fig. 1; and

Fig. 3 is a section taken on line 3—3 of Fig. 1.

Referring to the drawings there is shown in Fig. 1 a thermostatic device for controlling the flow of fluid fuel to the burner of an absorption type refrigerating apparatus responsive to the temperature of the cooling element. This thermostatic device comprises a casing 10 which encloses the control valve and expansible thermostat element 11, which latter is connected through a capillary tube 12 to a sensitive bulb 13 mounted on a cooling element of the apparatus, not shown.

Tension on the thermostat element 11 is varied by an adjusting screw 14 threaded through a cover plate 15 on the casing 10. The adjusting screw 14 is provided with a head or knob 16 and a dial 17, which latter is held in place by a screw 18. The dial 17 is appropriately inscribed, as shown in Fig. 2. In the rear of the dial a member 19 of resilient strip material having an aperture 20, is journaled on the adjusting screw 14 in a groove or undercut portion 23 behind the head 16. The member 19 has a larger opening 22 communicating with aperture 20 so that in assembling this member may be slipped over the adjusting screw 14 and then into the groove 23.

The upper end of member 19 is tapered and bent over to form a pointer 26 extending downwardly over the face of the dial 17. The latter is formed with a peripheral portion extending rearwardly from its face and provided with notches or recesses 21 in one of which the member 19 is normally held by its own resiliency. A flap 24 struck out of member 19 acts as a stop in conjunction with a set screw 25 or other fixed member on the cover 15 of the casing.

By pressing on the pointer 26, member 19 is disengaged from the dial 17 which can then be rotated to turn the screw 14 for adjusting the thermostat to its normal setting. When pressure on the pointer 26 is removed the member 19 springs back into the opposite notch or recess whereby it becomes movable integrally with the dial. If the dial is now disturbed from its normal position it is easily returned to the same setting by turning in the direction indicated on its face until the stop 24 on the member 19 is brought up against the set screw stop 25 on the cover 15. For instance, after the thermostat has been set for normal operation, as described above, the adjustment may be modified for defrosting by turning the dial a complete revolution counter-clockwise as indicated on the face of the dial, the turning movement being limited to one revolution by the stops 24 and 25. After defrosting, the thermostat is returned to its normal adjustment by turning the dial clockwise as indicated on its face until the stop 24 again engages the set screw 25.

It will be obvious to those skilled in the art that various other changes may be made in the construction and arrangement without departing from the spirit of the invention, and therefore the invention is not limited to what is shown in the drawings and described in the specification, but only as indicated in the appended claims.

I claim:

1. A rotary position indicator comprising a dial having a rearwardly extending notched edge, a member of resilient strip material pivoted concentrically with said dial and having a portion normally engaging a notch in said dial, a pointer formed by one end of said member and extending in indicating relation with said dial, a flap struck out of said member perpendicularly thereto, and a fixed stop to intercept said flap.

2. A rotary position indicator comprising a dial having a rearwardly extending notched edge, a resilient strip pivoted concentrically with said dial and having a portion normally engaging a notch in said dial, a pointer overlying the face of said dial, and formed integrally with said strip, and a fixed stop adapted to limit the movement of said strip.

3. A rotary position indicator comprising a dial having a rearwardly extending notched edge, a member rotatable concentrically with said dial and having a portion resiliently engaging a notch in said dial, a pointer in indicating relation with said dial and mounted on said member, and a stop adapted to limit the rotation of said member.

4. A device of the class described comprising a first movable member, a second movable member normally engaging said first member so as to be movable therewith, means for indicating the relative position of said members, means for disengaging said members, and means for limiting the movement of said second member.

5. In a device of the class described a first rotatable member, a second rotatable member normally engaging said first member so as to be rotated therewith, means for disengaging said members, and means for limiting the rotation of said second member.

6. In a device of the class described a first rotatable member, a second member rotatable concentrically with said first member, means for indicating the relative position of said members, means for limiting the rotation of said second member, and means for engaging and disengaging said members.

7. In combination with an expansible fluid thermostat, an adjusting screw therefor, a dial rotatable with said screw and having a downturned notched edge, a member of resilient strip material journaled on said screw concentrically with said dial and having a portion normally engaging a notch in said dial, a pointer formed at one end of said member and extending in indicating relation with said dial, a flap struck out of said member perpendicularly thereto, and a fixed stop to intercept said flap.

8. In combination with an expansible fluid thermostat, an adjusting screw therefor, a dial rotatable with said screw and having a rearwardly extending notched edge, a member journaled on said screw concentrically with said dial and having a portion resiliently engaging a notch in said dial, a pointer in indicating relation with said dial and mounted on said member, and a stop adapted to limit the rotation of said member.

9. In combination with a thermostat, an adjusting element therefor, a member movable with said adjusting element, a second movable member, means for indicating the relative positions of said members, means for limiting the movement of said second member, and means for engaging and disengaging said members.

10. In combination with a thermostat, a rotatable adjusting element therefor, a member rotatable with said element, a second member rotatable concentrically with said first member, means for indicating the relative positions of said members, means for limiting the rotation of said second member, and means for engaging and disengaging said members.

11. In combination, an automatic control device, a rotatable adjusting element for said device, a dial on said element, a rotatable member having a portion resiliently engaging said dial so as to be rotated therewith, means for limiting the rotation of said member, and means for disengaging said member from said dial.

In testimony whereof, I affix my signature.

SVEN W. E. ANDERSSON.